United States Patent
Park (10) Patent No.: US 6,739,051 B2
(45) Date of Patent: May 25, 2004

(54) METHOD FOR MANUFACTURING A PRESSURE ROLLER

(75) Inventor: Seo-Won Park, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 35 days.

(21) Appl. No.: 09/982,754

(22) Filed: Oct. 22, 2001

(65) Prior Publication Data

US 2002/0115546 A1 Aug. 22, 2002

(30) Foreign Application Priority Data

Feb. 20, 2001 (KR) .......................................... 2001/8505

(51) Int. Cl.⁷ ............................................... B23P 15/00
(52) U.S. Cl. ............................... 29/895.213; 29/895.3; 492/56; 492/59
(58) Field of Search ...................... 29/895.21, 895.213, 29/895.3, 895.23; 492/56, 54, 59; 399/333, 24; 156/60, 78, 242; 264/259, 275

(56) References Cited

U.S. PATENT DOCUMENTS

| | | | | |
|---|---|---|---|---|
| 4,956,211 A | * | 9/1990 | Saito ........................ 428/36.5 |
| 6,157,805 A | | 12/2000 | Haneda et al. | |
| 6,168,751 B1 | * | 1/2001 | Delrosario et al. ......... 264/642 |
| 6,173,131 B1 | | 1/2001 | Kitamura et al. | |
| 6,266,509 B1 | | 7/2001 | Ota et al. | |
| 6,435,246 B1 | * | 8/2002 | Kerr ........................... 156/553 |
| 6,440,347 B1 | * | 8/2002 | Izawa et al. ................ 264/262 |
| 6,463,981 B1 | * | 10/2002 | Kerr ........................... 156/555 |
| 2001/0006268 A1 | * | 7/2001 | Delrosario et al. ......... 264/262 |

* cited by examiner

*Primary Examiner*—I Cuda-Rosenbaum
(74) *Attorney, Agent, or Firm*—Robert E. Bushnell, Esq.

(57) ABSTRACT

A pressure roller for a fixing device is manufactured by extruding silicone rubber on a shaft, foaming the extruded silicone rubber, subjecting the foamed silicone rubber to primary and secondary heat treatments, polishing the heat-treated silicone rubber, and then disposing the polished silicone rubber in a resin tube. In accordance with one embodiment, the pressure roller includes a shaft, a first silicone rubber layer formed on the shaft so as to surround the shaft, a resin tube formed on the first silicone rubber layer so as to surround the shaft, the resin tube having extensions at opposite ends thereof, each extension extending beyond the opposite ends of the first silicone rubber layer, and second silicone rubber layers formed at respective opposite ends of the first silicone rubber layer between the extensions of the resin tube and the shaft. The second silicone rubber layers serve to couple the first silicone rubber layer to the resin tube. In accordance with another embodiment, the pressure roller includes a shaft, a silicone rubber layer extruded on the shaft using an extruder so as to surround the shaft, and foamed so as to have a number of pores, and a resin tube bonded to the silicone rubber layer while surrounding the silicone rubber layer by use of adhesive.

20 Claims, 5 Drawing Sheets

METHOD FOR MANUFACTURING A PRESSURE ROLLER

CLAIM OF PRIORITY

This application makes reference to, incorporates the same herein, and claims all benefits accruing under 35 U.S.C. §119 from my application PRESSURE ROLLER FOR FIXING DEVICE AND A MANUFACTURING METHOD OF THE SAME filed with the Korean Industrial Property Office on Feb. 20, 2001 and there duly assigned Serial No. 8505/2001.

BACKGROUND OF THE INVENTION

1. Technical Field

The present invention relates to a pressure roller for a fixing device in a printer and a method for manufacturing the pressure roller. More particularly, the present invention relates to a pressure roller used for a fixing device and configured to achieve an improved elastic strain, and a method for manufacturing the pressure roller.

2. Related Art

Generally, a printer includes a photosensitive medium, a light scanning device, a developing device, and a fixing device. A latent image is formed on the photosensitive medium by the light scanning device, and is then developed into a toner image by the developing device. The toner image is then transferred to a sheet. The fixing device serves to firmly fix the toner image to the sheet. Typically, such a fixing device includes a transfer roller arranged to rotate while contacting the photosensitive medium, and a pressure roller arranged to rotate while contacting the transfer roller. The transfer roller is internally or externally provided with a heater which serves to maintain the transfer roller at a high temperature in order to obtain an improved transfer of the toner image from the photosensitive medium to the sheet. The pressure roller, which rotates while contacting the transfer roller at a desired pressure, is made of a material exhibiting a thermal stability and a resistance against compression.

Exemplars of recent efforts include the FIXING APPARATUS of Ota et al., U.S. Pat. No. 6,266,509; THE IMAGE HEATING APPARATUS of Kitamura et al., U.S. Pat. No. 6,173,131 and; FIXING APPARATUS of Haneda et al., U.S. Pat. No. 6,157,805.

The pressure roller typically includes a shaft and a resin tube. A silicone rubber layer is interposed between the resin tube and the shaft.

In order to manufacture a pressure roller having the above mentioned configuration, the resin tube is fitted in a mold having the shape of a pipe with a circular cross section. The shaft is then concentrically arranged in the resin tube in a fixed state. That is, the shaft is supported by the mold so that it is maintained in a fixed state. The shaft has an outer diameter which is less than the inner diameter of the resin tube by a desired amount.

Under a condition in which the shaft is maintained in a fixed state in the resin tube, liquid-phase silicone rubber is injected between the inner surface of the resin tube and the outer surface of the shaft. As moisture contained in the liquid-phase silicone rubber is vaporized, a porous silicone rubber layer is formed. In order to allow the silicone rubber layer to come into tight contact with the resin tube, the entire inner surface of the resin tube is subjected to an etching treatment. An adhesive is also coated on the etched inner surface of the resin tube.

After completion of the formation of the silicone rubber layer, the molded product is removed from the mold. Thus, manufacture of the pressure roller is completed.

The silicone rubber layer interposed between the inner surface of the resin tube and the outer surface of the shaft should have a porous structure which is formed by vaporization. To this end, a low temperature vulcanizing (LTV) silicone rubber is used as the material of the silicone rubber layer in order to achieve formation of pores in a temperature range not causing deformation of the resin tube. However, such LTV silicone rubber is expensive as compared to high temperature vulcanizing (HTV) silicone rubber which is foamed at a high temperature of about 120° C. to form pores.

Furthermore, the pressure roller described above has a high manufacturing cost because the entire inner surface of the resin tube must be subjected to an etching treatment in order to allow the silicone rubber layer to come into tight contact with the resin tube.

In addition, the pressure roller should exhibit an elastic strain sufficient to reduce the pressure of the pressure roller against the transfer roller while allowing the pressure roller to have a contact surface with superior flatness. However, the silicone rubber layer described above exhibits a high degree of hardness. As a result, there is a disadvantage in that it is necessary to increase the pressure to be applied to the transfer roller.

SUMMARY OF THE INVENTION

The present invention has been developed in view of the above mentioned problems, and an object of invention is to provide an improved pressure roller and method of manufacturing such a pressure roller for a fixing device.

It is also an object to provide a pressure roller for a fixing device and a method of manufacturing such a pressure roller which uses HTV silicone rubber exhibiting a foamability at a high temperature, thereby reducing manufacturing cost while exhibiting a desired elastic strain at a low pressure.

In accordance with one aspect, the present invention provides a pressure roller for a fixing device, that may be constructed with a shaft; a first silicone rubber layer formed on the shaft as an axially elongate cylindrical layer so as to surround the shaft and the first silicone rubber layer; a resin tube formed on the first silicone rubber layer so as to surround the shaft, the resin tube having extensions at opposite ends thereof, each extension extending beyond an opposite end of the first silicone rubber layer; and second silicone rubber layers, each formed at a respective axially opposite end of the first silicone rubber layer between the extensions of the resin tube and the shaft, the second silicone rubber layers serving to couple the first silicone rubber layer to the resin tube.

In accordance with another aspect, the present invention provides a pressure roller for a fixing device, that may be constructed with a shaft; a silicone rubber layer extruded on the shaft as an axially elongate cylindrical layer using an extruder so as to surround the shaft, and foamed so as; to have a number of pores; and a resin tube bonded by adhesive to the silicone rubber layer while surrounding the silicone rubber layer.

In accordance with another aspect, the present invention provides a method for manufacturing a pressure roller for a fixing device by forming a silicone rubber layer by extruding silicone rubber on a shaft with an extruder, and curing the extruded silicone rubber to foam the silicone rubber, thereby forming a silicone rubber layer having a number of pores. A resin tube forms a cylindrical sheath that surrounds and encases the silicone rubber layer. The resin tube is bonded to the silicone rubber layer with an adhesive while surrounding the silicone rubber layer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DESCRIPTION OF THE PREFERRED EMBODIMENTS

Figure 1A:
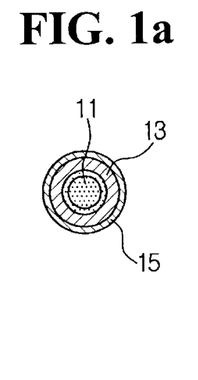
FIGS. 1a and 1b are side and sectional views, respectively, of a pressure roller used for a fixing device.
Figure 1B:
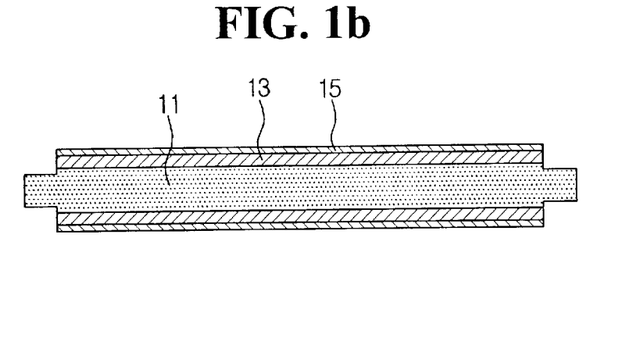

FIGS. 1a and 1b are side and sectional views, respectively, of a pressure roller used for a fixing device. Referring to FIG. 1, the pressure roller includes a shaft 11, a resin tube 15, and a silicone rubber layer 13 interposed between the resin tube 15 and the shaft 11.

In order to manufacture the pressure roller having such a configuration, the resin tube 15 is fitted in a mold having the shape of a pipe with a circular cross section. The shaft 11 is then concentrically disposed in the resin tube 15 in a fixed state. The shaft 11 is supported by the mold so that it is maintained in a fixed state. The shaft 11 has an outer diameter which is less than the inner diameter of the resin tube 15 by a desired amount.

Under a condition in which the shaft 11 is maintained in a fixed state in the resin tube 15, liquid-phase silicone rubber is injected between the inner surface of the resin tube 15 and the outer surface of the shaft 11. As moisture contained in the liquid-phase silicone rubber is vaporized, a porous silicone rubber layer 13 is formed. In order to allow the silicone rubber layer 13 to come into tight contact with the resin tube 15, the entire inner surface of the resin tube 15 is subjected to an etching treatment. An adhesive is also coated on the etched inner surface of the resin tube 15.

After completion of the formation of the silicone rubber layer 13, the molded product is removed from the mold. Thus, manufacture of the pressure roller is completed.

The silicone rubber layer 13 interposed between the inner surface of the resin tube 15 and the outer surface of the shaft 11 should have a porous structure which is formed by vaporization. To this end, a low temperature vulcanizing (LTV) silicone rubber is used as the material of the silicone rubber layer 13 in order to achieve formation of pores in a temperature range not causing deformation of the resin tube 15. However, such LTV silicone rubber is expensive as compared to high temperature vulcanizing (HTV) silicone rubber which is foamed at a high temperature of about 120° C. to form pores.

Furthermore, the pressure roller described above has a high manufacturing cost because the entire inner surface of the resin tube 15 must be subjected to an etching treatment in order to allow the silicone rubber layer 13 to come into tight contact with the resin tube 15.

Figure 2A:
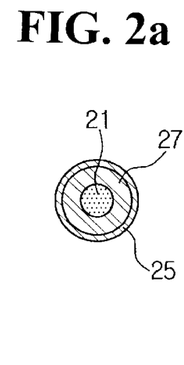
FIGS. 2a and 2b are side and sectional views, respectively, of a pressure roller used for a fixing device in accordance with a first embodiment of the present invention.
Figure 2B:
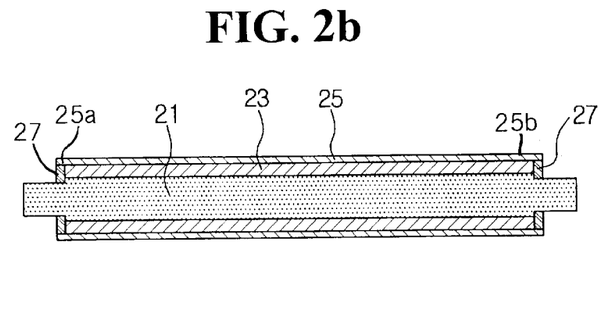

FIGS. 2a and 2b are side and sectional views, respectively, of a pressure roller used for a fixing device in accordance with a first embodiment of the present invention. Referring to FIGS. 2a and 2b, the pressure roller includes a shaft 21, a first silicone rubber layer 23, a resin tube 25, and second silicone rubber layers 27. The first silicone rubber layer 23 is formed on the shaft 21 in accordance with an extrusion process using an extruder. The first silicone rubber layer 23 is also foamed to have a porous structure. The resin tube 25 has extensions 25a and 25b at respective opposite ends thereof, each extension 25a, 25b extending beyond an associated one of the opposite ends of the first silicone rubber layer 23. Each extension 25a, 25b of the resin tube 25 is etched to a desired depth in order to obtain a desired surface roughness. Each of the second silicone rubber layers 27 is formed at a space defined at an associated end of the first silicone rubber layer 23 between an inner surface of the associated extension 25a or 25b of the resin tube 25 and the outer surface of the shaft 21. The second silicone rubber layers 27 serve to fix the first silicone rubber layer 23 to the resin tube 25.

Figure 3A:
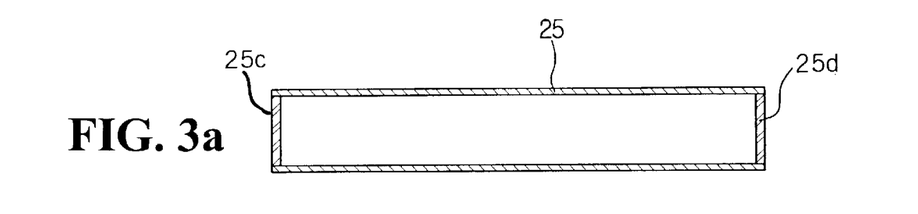
FIGS. 3a and 3b are partially-sectioned views of a resin tube and a first silicone rubber layer formed on a shaft, respectively, in the pressure roller shown in FIGS. 2a and 2b.
Figure 3B:
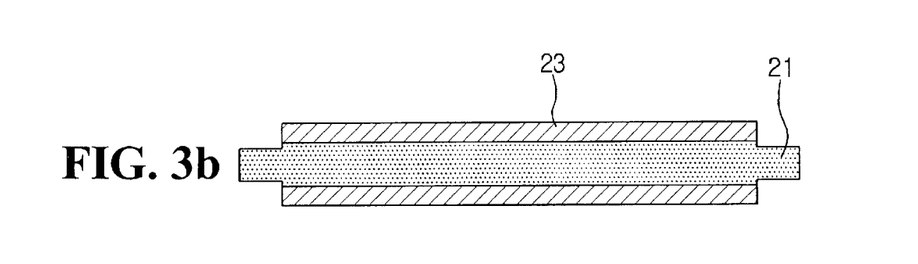

FIGS. 3a and 3b are partially-sectioned views of the resin tube and the first silicone rubber layer formed on the shaft, respectively, in the pressure roller shown in FIGS. 2a and 2b. In FIGS. 3a and 3b, elements corresponding to those in FIGS. 2a and 2b are denoted by the same reference numerals.

Referring to FIGS. 2a thru 3b, the resin tube 25 has a cylindrical structure having a desired inner diameter, a desired outer diameter, and a desired longitudinal length. The resin tube 25 is provided with etched portions 25c and 25d at respective opposite longitudinal ends thereof. Preferably, the resin tube 25 is made of polytetrafluoroethylene (PTFE) or perfluoroalkyl vinyl ether (PFA) exhibiting a high heat resistance and a high compression resistance while being effective to avoid surface contamination resulting from surface friction against a sheet.

The procedure for manufacturing the pressure roller having the above mentioned configuration will now be described. As shown in FIG. 3b, the shaft 21 is prepared by being machined to have a desired outer diameter. Thereafter, a silicone rubber material augmented with a foaming agent is extruded on the shaft 21 using an extruder, thereby forming a silicone rubber layer 23. For the silicone rubber material, an inexpensive HTV silicone rubber is used. Since HTV silicone rubber can be cured at a high temperature, the silicone rubber layer 23 extruded on the shaft 21 is subjected to a curing process in a chamber maintained at about 120° C. In accordance with this curing process, the silicone rubber layer 23 is foamed so as to have a number of pores.

The silicone rubber layer 23, which has a porous structure in accordance with the curing process, is then subjected to a primary heat treatment in a chamber maintained at about 200° C. During the primary heat treatment, vapors are generated at the silicone rubber layer 23. Those vapors are diffused around pores present on the surface of the silicone rubber layer 23 by virtue of migration and permeation phenomena resulting from intrinsic characteristics of the silicone rubber. Thus, undesirable vapors can vent from the silicone rubber layer 23 in accordance with the primary heat treatment.

The silicone rubber layer 23 subjected to the primary heat treatment is then subjected to a secondary heat treatment in a chamber maintained at a temperature of 180 to 200° C. The secondary heat treatment is carried out under a condition in which ambient air is forcibly circulated. By virtue of such a forced circulation of ambient air, the odor of silicone rubber can be removed. After completion of the secondary heat treatment, the silicone rubber layer 23 is polished so as to have an outer diameter corresponding to the inner diameter of the resin tube 25 so that it can be disposed in the resin tube 25. The silicone rubber layer 23 is also subjected to a cutting process so that it has a longitudinal length less than that of the resin tube 25 at respective opposite ends thereof. Thus, the first silicone rubber layer 23 is completely formed.

After the formation of the first silicone rubber layer 23, the resin tube 25 is fitted around the first silicone rubber layer 23. The fitting process is carried out in such a fashion that the resin tube 25 is provided at opposite ends thereof with extensions 25a and 25b, respectively, extending beyond respective ends of the first silicone rubber layer 23 and corresponding to respective etched portions 25c and 25d. A liquid-phase silicone rubber is then injected into a space defined by each etched portion 25c, 25d of the resin tube 25. As the liquid-phase silicone rubber is subjected to a vaporization process, the second silicone rubber layer 27 is formed. Since the second silicone rubber layer 27 should exhibit the same compressibility as the first silicone rubber layer 23, it is preferred that the second silicone rubber layer 27 be made of a silicone rubber material exhibiting a degree of hardness less than that of the first silicone rubber layer 23. Since the formation of pores in the second silicone rubber layer 27 in accordance with the vaporization is carried out under a condition in which the second silicone rubber layer 27 is applied to the resin tube 25, it is preferred that the second silicone rubber layer 27 be made of LTV silicone rubber in order to conduct the vaporization without any deformation of the resin tube 25.

Thus, the manufacture of the pressure roller of FIGS. 2a and 2b according to the first embodiment of the present invention is complete. As is apparent from the above description, the pressure roller according to the first embodiment achieves a reduction in material costs because it mainly uses inexpensive HTV silicone rubber in accordance with the application of an extrusion process, while partially using an expensive liquid-phase silicone rubber only for a small part thereof which requires application of an injection process. Also, it is possible to achieve a reduction in treatment costs in that only a part of the resin tube is subjected to the etching treatment.

Figure 4A:
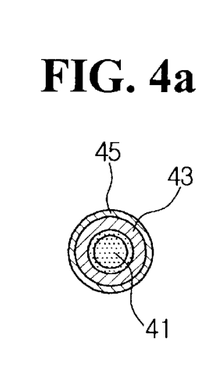
FIGS. 4a and 4b are side and sectional views, respectively, of a pressure roller used for a fixing device in accordance with a second embodiment of the present invention.
Figure 4B:
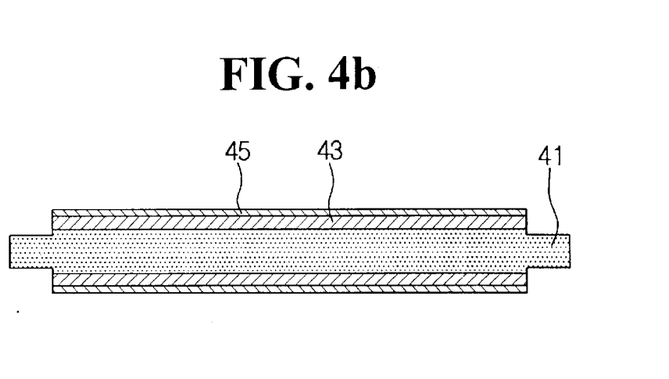

FIGS. 4a and 4b are side and sectional views, respectively, of a pressure roller used for a fixing device in accordance with a second embodiment of the present invention. Referring to FIGS. 4a and 4b, the pressure roller includes a shaft 41, a silicone rubber layer 43 formed on the shaft 41 in accordance with an extrusion process using an extruder and foamed to have a number of pores, and a resin tube 45 disposed around the silicone rubber layer 43 and coated with adhesive at an inner surface thereof facing the outer surface of the silicone rubber layer 43 so that it is coupled with the silicone rubber layer 43.

Figure 5A:
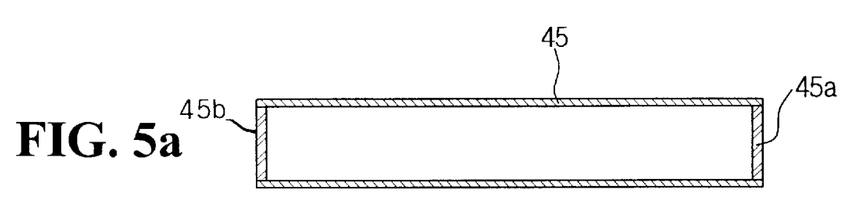
FIGS. 5a and 5b are partially-sectioned views of a resin tube and a foamed silicone rubber layer formed on a shaft in accordance with an extrusion process, respectively, in the pressure roller shown in FIGS. 4a and 4b.
Figure 5B:
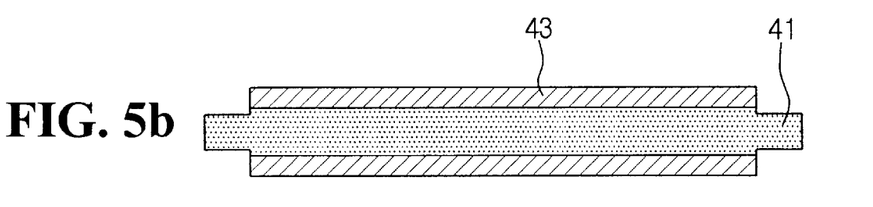

FIGS. 5a and 5b are partially-sectioned views of the resin tube and the foamed silicone rubber layer formed on the shaft in accordance with an extrusion process, respectively, in the pressure roller of FIGS. 4a and 4b. In FIGS. 5a and 5b, elements corresponding to those in FIGS. 4a and 4b are denoted by the same reference numerals.

Referring to FIGS. 4a thru 5b, the resin tube 45 has the same structure as the resin tube 25 according to the first embodiment shown in FIG. 3a. The resin tube 45 is provided with etched portions 45a and 45b in the same fashion as in the first embodiment. It is preferred that the resin tube 45 be made of PTFE, as in the first embodiment.

As shown in FIG. 5b, the shaft 41 is prepared by being machined to have a desired outer diameter. Thereafter, a silicone rubber material augmented with a foaming agent is extruded on the shaft 41 using an extruder, thereby forming a silicone rubber layer 43. For the silicone rubber material, inexpensive HTV silicone rubber is used. The silicone rubber layer 43 is cured, and then sequentially subjected to a primary heat treatment and a secondary heat treatment. The curing process, the primary heat treatment and the secondary heat treatment are carried out in the same fashion as in the first embodiment.

After completion of the secondary heat treatment, the silicone rubber layer 43 is subjected to a cutting process so that it has the same longitudinal length as the resin tube 45. The silicone rubber layer 43 is also polished so as to have an outer diameter corresponding to the inner diameter of the resin tube 45 so that it can be fitted in the resin tube 45. Thus, the silicone rubber layer 43 is completed formed. In order to bond the silicone rubber layer 43 to the resin tube 45, adhesive (for example, S-33-156-1 manufactured by Shinetsu Chemical Co.) is coated over each etched portion 45a and 45b of the resin tube 45. In accordance with the adhesive used, it may be unnecessary to provide the etched portions 45a and 45b, in which case the etching process may be omitted. The shaft 41 with the polished silicone rubber layer 43 is then disposed in the resin tube 45. The silicone rubber layer 43 is then bonded to the resin tube 45, and the manufacture of the pressure roller is complete.

As is apparent from the above description, the pressure roller according to the second as embodiment can achieve a reduction in material costs because it only uses inexpensive HTV silicone rubber in accordance with application of extrusion and foaming processes. Also, it is possible to achieve a reduction in treatment costs in that only a part of the resin tube is subjected to the etching treatment, or the resin tube is not subjected to etching treatment at all.

Figure 6:
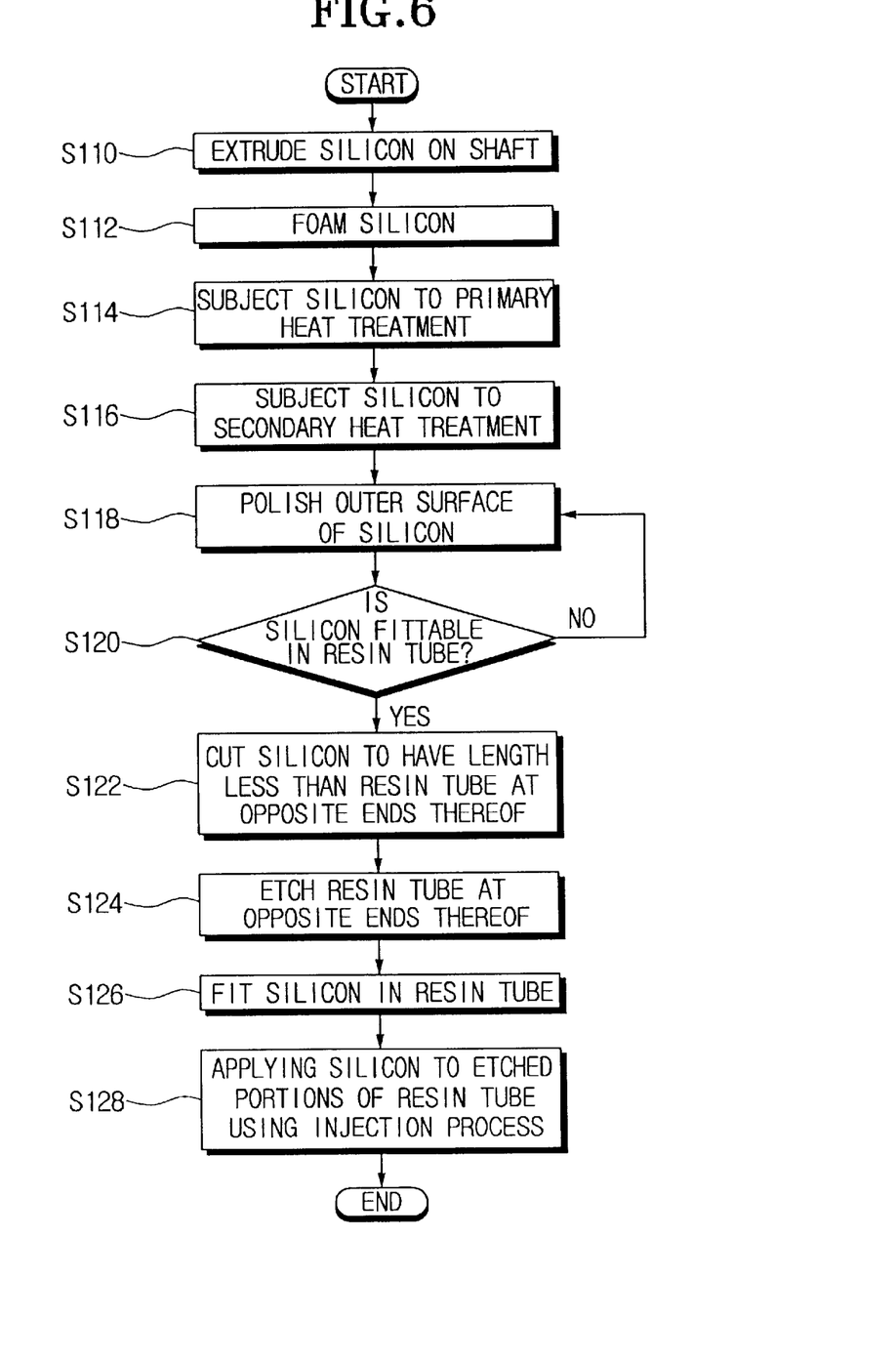
FIG. 6 is a flow chart illustrating a method for manufacturing the pressure roller according to the first embodiment of the present invention.

FIG. 6 is a flow chart illustrating a method for manufacturing the pressure roller according to the first embodiment of the present invention.

In accordance with this method, HTV silicone rubber augmented with a foaming agent is extruded on the shaft 21 using an extruder, thereby forming silicone rubber layer 23 (Step S110). The silicone rubber layer 23 is then subjected to a curing process in a chamber maintained at about 120° C. so that it is foamed in order to form a number of pores (Step S112). The foamed silicone rubber layer 23 is then subjected to a primary heat treatment in a chamber maintained at about 200° C. (Step S114). During the primary heat treatment, undesirable vapors are removed from the silicone rubber layer 23. The silicone rubber layer 23 subjected to the primary heat treatment is then subjected to a secondary heat treatment in a chamber maintained at a temperature of 180 to 200° C. (Step S116). The secondary heat treatment is carried out under a condition in which ambient air is forcibly circulated. By virtue of such a forced circulation of ambient air, the odor of silicone rubber is removed. After completion of the secondary heat treatment, the silicone rubber layer is polished so as to have an outer diameter corresponding to the inner diameter of the resin tube 25 so that it can be disposed in the resin tube 25 (Step S118). The polishing process is continued until the silicone rubber layer has an outer diameter which allows the silicone rubber layer 23 to be tight-fitted in the resin tube 25 (Step S120).

After completion of the polishing process, the silicone rubber layer 23 is subjected to a cutting process so that it has a longitudinal length less than that of the resin tube 25 at opposite ends thereof (Step S122). Accordingly, the resin tube 25 may have, at opposite ends thereof, extensions 25a, 25b extending beyond respective ends of the silicone rubber layer 23 so as to have the same length when the silicone rubber layer 23 is disposed in the resin tube 25. Thereafter, the extensions 25a, 25b of the resin tube 25 are etched so as to form etched portions 25c, 25d to which a liquid-phase silicone rubber is to be applied (Step S124). The cut silicone rubber layer 23 is then disposed in the resin tube 25 in such a fashion that the resin tube 25 has, at opposite ends thereof, extensions 25a, 25b extending beyond respective ends of the silicone rubber layer 23 by the same length (Step S126). Thus, the first silicone rubber layer 23 is completed formed. After the fitting of the first silicone rubber layer 23, a liquid-phase silicone rubber is injected into a space defined by each extension 25a, 25b of the resin tube 25 (Step S128). In this case, it is preferable to use LTV silicone rubber exhibiting a degree of hardness less than that of HTV silicone rubber because the resultant layer can exhibit the same compressibility as the first silicone rubber layer 23, and can be subjected to a desired vaporization without any deformation of the resin tube 25.

The injected liquid-phase silicone rubber is maintained at ambient temperature as it is, or is subjected to vaporization in a temperature range not causing any deformation of the resin tube 25 so that it has a number of pores. That is, the injected liquid-phase silicone rubber is formed into the second silicone rubber layer 27. Thus, the procedure for manufacturing the pressure roller according to the first embodiment of the present invention is complete.

Figure 7:
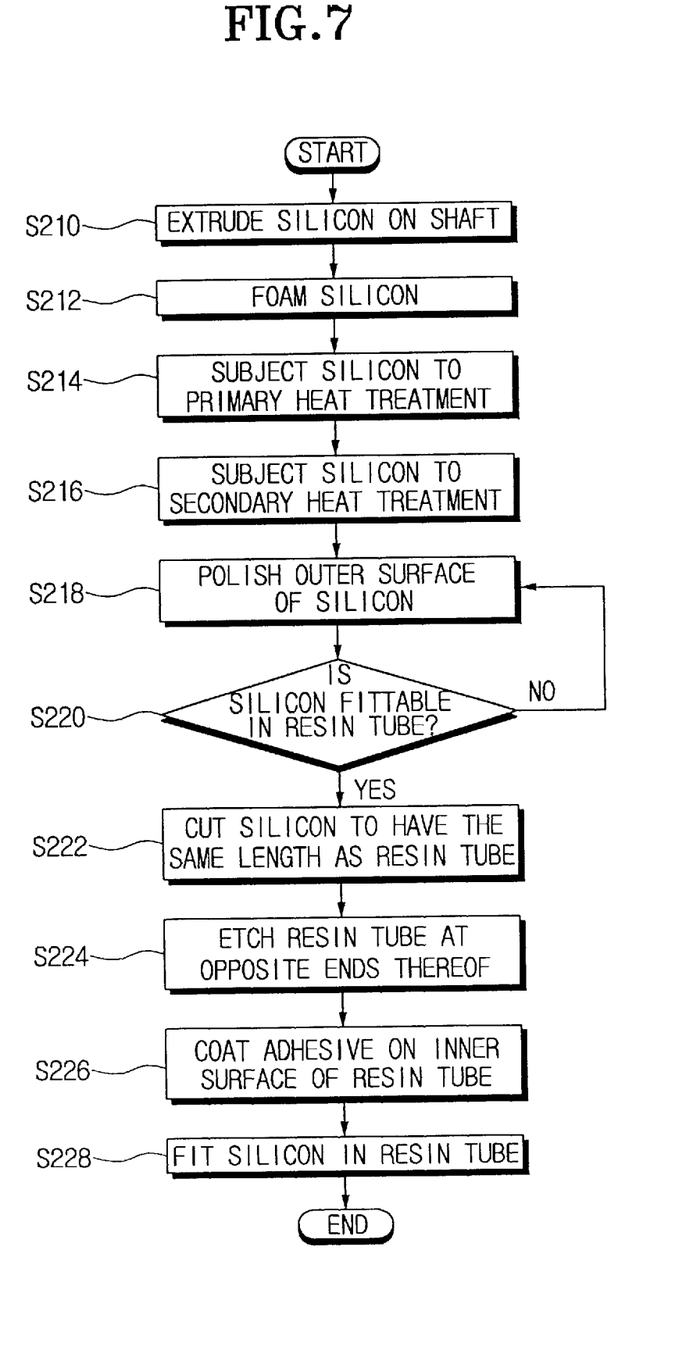
FIG. 7 is a flow chart illustrating a method for manufacturing the pressure roller constructed as a second embodiment of the present invention.

FIG. 7 is a flow chart illustrating a method for manufacturing the pressure roller according to the second embodiment of the present invention.

In this method, steps for extruding silicone rubber on the shaft 41 (Step S210), foaming the extruded silicone rubber (Step S212), subjecting the foamed silicone rubber to primary and secondary heat treatments (Steps S214 and S216), and polishing the heat-treated silicone rubber (Step S218) are carried out in the same fashion as those of FIG. 6 associated with the first embodiment of the present invention. In accordance with this method, the polishing process is continued until the silicone rubber layer 43 has an outer diameter which allows the silicone rubber layer 43 to be tight-fitted in the resin tube 45 (Step S220).

After completion of the polishing process, the silicone rubber layer 43 is subjected to a cutting process so that it has the same longitudinal length as the resin tube 45 (Step S222). The resin tube 45 is also subjected to an etching process so that it has etched portions 45a and 45b which have the same length at respective opposite ends thereof (Step S224). An adhesive then is coated over each etched portion 45a and 45b of the resin tube 45 (Step S226). In accordance with the adhesive used, it may be unnecessary to provide the etched portions 45a and 45b, in which case the etching process may be omitted. The cut silicone rubber layer 43 is then disposed in the resin tube 45, and the cut silicone rubber layer 43 is bonded to the resin tube 45 (Step S228). Thus, the cut silicone rubber layer 43 is formed, and the procedure for manufacturing the pressure roller according to the second embodiment of the present invention is complete.

Although the preferred embodiments of the invention have been disclosed for illustrative purposes, those skilled in the art will appreciate that various modifications, additions and substitutions are possible without departing from the scope and spirit of the invention, as disclosed in the accompanying claims.

What is claimed is:

1. A method for manufacturing a pressure roller for a fixing device, comprising the steps of:

forming a silicone rubber layer by extruding silicone rubber on a shaft, and curing the extruded silicone rubber to foam the silicone rubber, thereby providing the silicone rubber layer with a plurality of pores; and bonding a resin tube to the silicone rubber layer, said resin tube surrounding the silicone rubber layer, wherein the step of forming the silicone rubber layer further comprises polishing the foamed silicone rubber so that it has a given outer diameter, wherein the curing of the extruded silicone rubber is carried out in a chamber maintained at substantially 120° C., wherein the step of forming the silicone rubber layer further comprises the sub-steps of:

subjecting the cured silicone rubber to a primary heat treatment in a chamber maintained at substantially 200° C. to form heat-treated silicone rubber; and subjecting the heat-treated silicone rubber to a secondary heat treatment in a chamber maintained at substantially 190° C. while forcibly circulating ambient air in the chamber, wherein the step of forming the silicone rubber layer further comprises cutting the heat-treated silicone rubber so that it has a length less than a length of the resin tube.

2. The method according to claim 1, wherein the step of bonding the resin tube comprises the sub-steps of:

etching an inner surface of the resin tube at a portion of the resin tube extending beyond the cut heat-treated silicone rubber; and disposing the polished foamed silicone rubber in the resin tube, and applying a liquid-phase silicone rubber to the etched inner surface of the resin tube in accordance with an injection process.

3. The method according to claim 2, wherein the step of forming the silicone rubber layer further comprises the sub-steps of:

cutting the cured silicone rubber subjected to the primary heat treatment so that it has the same length as the resin tube; and disposing the cut cured silicone rubber in the resin tube while applying an adhesive between the silicone rubber and the resin tube so that the silicone rubber layer is coupled to the resin tube.

4. A method for manufacturing a pressure roller for a fixing device, comprising the steps of:

forming a silicone rubber layer by extruding silicone rubber on a shaft, and curing the extruded silicone rubber to foam the silicone rubber, thereby providing the silicone rubber layer with a plurality of pores; and bonding a resin tube to the silicone rubber layer, said resin tube surrounding the silicone rubber layer, wherein the step of forming the silicone rubber layer further comprises polishing the foamed silicone rubber so that it has a given outer diameter;

wherein the step of forming the silicone rubber layer further comprises cutting the silicone rubber so that it has a length less than a length of the resin tube; and wherein the step of bonding the resin tube comprises the sub-steps of:
  etching an inner surface of the resin tube at a portion of the resin tube extending beyond the cut silicone rubber; and
  disposing the polished foamed silicone rubber in the resin tube, and applying a liquid-phase silicone rubber to the etched inner surface of the resin tube in accordance with an injection process.

5. A method for manufacturing a pressure roller for a fixing device, comprising the steps of:
  extruding silicone rubber on a shaft;
  cutting the extruded silicone rubber so that it has a same length as a resin tube;
  etching an inner surface of the resin tube prior to applying adhesive between the silicone rubber and the resin tube; and inserting the cut and extruded silicone rubber on said shaft into said resin tube, said method further comprising the step of disposing the cut silicone rubber in the resin tube while applying an adhesive between the silicone rubber and the resin tube so that the silicone rubber layer is coupled to the resin tube, wherein applying the adhesive comprises applying a liquid-phase silicone rubber to the etched inner surface of the resin tube in accordance with an injection process.

6. A method for making a pressure roller for a fixing device, comprising the steps of:
  forming high temperature vulcanized (HTV) silicone rubber about a shaft;
  curing the HTV silicone rubber about the shaft by subjecting the HVT silicone rubber and the shaft to a temperature of 120 degrees Celsius, said curing causing said HTV silicone rubber to foam, said curing and foaming being accomplished in the absence of a presence of a resin outer layer; and
  fitting said cured and foamed HTV silicone rubber and shaft inside a resin tube after said curing and foaming step.

7. The method of claim 6, further comprising the steps of subjecting said HTV silicone rubber and said shaft to a pair of heat treatments of approximately 200 degrees Celsius, said heat treatments being applied in the absence of said resin tube and prior to fitting said silicone rubber and shaft inside said resin tube.

8. The method of claim 6, further comprising the step of cutting said cured and foamed HTV silicone rubber from said HTV silicone rubber and shaft combination so that said HTV silicone rubber has a length slightly less than said resin tube prior to said fitting said cured and foamed HTV silicone rubber inside said resin tube.

9. The method of claim 8, further comprising the step of etching ends off of said resin tube to convert said resin tube from a closed cylindrical structure to an open cylinder with a length slightly greater than a length of said HTV silicone rubber and shaft combination.

10. The method of claim 9, fitting step being accomplished so that said HTV silicone rubber and shaft combination is centered in said resin tube and said resin tube extending slightly beyond said HTV silicone rubber and shaft combination at both ends.

11. The method of claim 10, said etching causing said resulting open cylinder shaped resin tube to have an inner surface etched only at ends of said inner surfaces of said resin tube where the resin tube extends beyond said HTV silicone rubber and shaft combination.

12. The method of claim 11, further comprising the step of applying Low Temperature Vulcanized (LTV) silicone rubber at ends of said roller to cover exposed portions of said cured and foamed HTV silicone rubber.

13. The method of claim 12, said LTV silicone rubber being attached to said etched portions of said inner surface of said resin tube.

14. The method of claim 11, further comprising the step of applying an adhesive to an inner surface of said resin tube prior to said fitting step.

15. The method of claim 6, said resin tube never being deformed in any way during said process.

16. A method for making a pressure roller for a fixing device, comprising the steps of:
  forming high temperature vulcanized (HTV) silicone rubber about a shaft;
  curing the HTV silicone rubber about the shaft by subjecting the HVT silicone rubber and the shaft to a temperature of 120 degrees Celsius, said curing causing said HTV silicone rubber to foam, said curing and foaming being accomplished in the absence of a presence of a resin outer layer; and
  fitting said cured and foamed HTV silicone rubber and shaft inside a resin tube after said curing and foaming step, said resin tube being longer than said cured and foamed HTV silicone rubber, said cured and foamed HTV silicone rubber being centered in said resin tube causing inner surfaces of said resin tube to be exposed at both ends.

17. The method of claim 16, further comprising the step of etching the end portions of the inner surfaces of the resin tube prior to said fitting step.

18. The method of claim 16, further comprising the step of applying LTV silicone rubber to cover both ends of said cured and foamed HTV silicone rubber after said fitting step.

19. The method of claim 16, said inner surface of said resin tube being coated with an adhesive prior to said fitting step.

20. The method of claim 16, said resin tube never being deformed and never changing shape or size throughout said process, said resin tube never being exposed to heat throughout said process.

* * * * *